United States Patent [19]

Scheller et al.

[11] Patent Number: 5,010,553

[45] Date of Patent: Apr. 23, 1991

[54] HIGH SPEED, ERROR-FREE DATA TRANSMISSION SYSTEM AND METHOD

[75] Inventors: Clifford D. Scheller, Bartlett; Aaron A. Collins, Arlington Heights; Joseph M. Hansen, Roselle, all of Ill.

[73] Assignee: Compuquest, Inc., Schaumburg, Ill.

[21] Appl. No.: 279,914

[22] Filed: Dec. 5, 1988

[51] Int. Cl.⁵ .............................................. G08C 25/00
[52] U.S. Cl. .................................... 371/35; 371/2.1; 371/32
[58] Field of Search ................. 371/2.1, 32, 33, 35

[56] References Cited

U.S. PATENT DOCUMENTS

| | | | |
|---|---|---|---|
| 3,278,729 | 10/1966 | Chien | 371/39.1 |
| 3,657,699 | 4/1972 | Rocher et al. | 371/2.1 |
| 3,979,719 | 9/1976 | Tooley et al. | 371/32 |
| 4,149,142 | 4/1979 | Kageyama et al. | 371/32 |
| 4,394,642 | 7/1983 | Currie et al. | 371/2.1 |
| 4,559,625 | 12/1985 | Berlekamp | 371/2.1 |
| 4,720,829 | 1/1988 | Fukasawa et al. | 371/2.1 |
| 4,730,348 | 3/1988 | MacCrisken | 371/33 |
| 4,829,526 | 5/1989 | Clark et al. | 371/35 |

*Primary Examiner*—Charles E. Atkinson
*Attorney, Agent, or Firm*—Nicholas A. Camasto

[57] ABSTRACT

A method of operating a high speed, error-free data transmission system in a noisy medium comprises compressing data determined to be compressible, forward error correcting the data and interleaving the data in a bit matrix memory to enhance the forward error correction. Digital information packets are formulated including a header bearing a packet number, the total packet byte count, any packet number resend request, the data byte count of the actual data and a CRC. The digital information packet is loaded onto a transmitter carousel having a fixed number of sectors. The receiver receives the data, requests resend of any packet (by number) that is defective, error corrects if necessary and sequentially loads the packet onto a receiver carousel. Packets or sequential packet groups are removed from the carousel, selectively decompressed and the data words extracted and sent to the output.

17 Claims, 10 Drawing Sheets

Write sequentially scanning from left to right.

01, 02, 03,...23E, 23F, 240.

Read sequentially scanning from bottom to top.

| SOH #1 | SOH #2 | BYTE CNT LOW | CNT HI | BLOCK NUM | DATA LOW | CNT HI or 0 | NAK LOW or 0 | HDR CRC LOW | HDR CRC HI | USER DATA AREA VARIABLE SIZE | HDR CRC LOW | HDR CRC HI |

HIGH SPEED, ERROR-FREE DATA TRANSMISSION SYSTEM AND METHOD

BACKGROUND OF THE INVENTION AND PRIOR ART

This invention relates generally to data transmission systems and particularly to a method of operating a high speed data transmission system that is capable of error-free transfer of data in a noisy medium or in one containing other aberrations. The inventive method will be of particular benefit when used in a cellular telephone environment.

The prior art discloses many information transmission systems. A fundamental form is a basic telephone to convey voice frequency electrical signals over a pair of wires. Information that is transmitted over telephone lines is generally less susceptible to noise, phase changes and interruptions, than is information that is sent over a radio frequency link. Dedicated or so-called "leased lines" are telephone lines that essentially bypass the telephone switching network and are even less susceptible to noise. Accurate, high speed transfer of data in such a medium is quite realizable.

The fairly recent cellular telephone service uses radio links to interconnect mobile telephones with other mobile telephones and with conventional telephones via a telephone switching network. Mobile telephone service involves a very hostile environment. It uses frequency modulation of an RF carrier that is susceptible to interference, noise, fading, signal loss and phase shifting. While presently analog voice signals are carried reasonably well, the analog transmission of digital data, which is readily carried out over normal telephone lines, is rendered nearly impossible due to noise and other aberrations, such as those above mentioned, in the cellular telephone medium.

There are two fundamental problems in data transmission: accuracy and speed. Conventional data transmission systems are known wherein data is formulated into blocks or packets and some form of error protection, such as a check sum or a cyclic redundancy code (CRC), is appended to the data for providing a means at the receiver to determine whether the data has been corrupted or impaired during transmission. If an impaired packet is received, the receiver signals the transmitter to retransmit, beginning with the impaired packet.

There are well-known mathematical and physical techniques for compressing data to reduce the necessity of transmitting repetitive bit groupings. In data compression, a "compression table") (or "hash" table as it is colloquially referred to) is constructed of patterns of characters or bit groupings with the various patterns being identified. The pattern identifiers are transmitted rather than the character patterns or bit groupings themselves. These techniques can be shown to improve system throughput by allowing more data to be sent in a shorter time period and are in common usage. In the preferred embodiment, a system of data compression based upon the Lempel-Zev-Welch (LZW) compression technique is utilized. Information on LZW compression may be found in A Method for Construction of Minimum Redundancy Codes by D. A. Huffman, Proceeding of the IRE, 1952 and Pattern Matching in Strings SIAM, by D. E. Knuth, Journal on Computing, June 1977. There are many other treatises on the subject.

The technique known as forward error correction (FEC) is also known for detecting and correcting errors in data. Mathematical models by Huffman and Golay, (and others), for error correcting bit strings are known. In all of the FEC systems, the number of bytes of transmitted information is significantly increased and generally permits the detection of only a limited number of bit errors in a protected bit packet and the correction of a lesser number of bit errors in the protected bit packet. Errors in excess of the correctable number require retransmission. FEC systems have been sparingly used.

In Golay encoding, which is used in the invention, a check word is created to forward error correct a code word. A code word is generally the same as a data word. The term, however, is used herein to differentiate from a data word since, in the embodiment of the invention chosen for purposes of description, a 12 bit code word is equal to one and one-half 8 bit data words. A significant drawback to Golay FEC is that the size of the check word is non-linearly related to the number of bits to be forward error corrected. For example, in a system where three bits are protected, the check word size is equal to the code word size, i.e., the number of bits processed is doubled. Throughput suffers accordingly. FEC encoding in a high speed transmission system, such as one operating at 4800 Baud, is of limited use because it does not significantly decrease the need to resend data that is corrupted. For example, a noise pulse 0.1 seconds in duration will destroy or impair 480 bits. Consequently, such FEC techniques have not found favor in high speed data transmission systems operating over even moderately hostile links. Further information on FEC and Golay encoding may be found in the following: The Theory of Error—Correcting Codes by F. J. MacWilliams and N. J. A. Sloane, Amsterdam: North Holland, 1977; Analog Transmission Performance on the Switched Telecommunications Network by F. P. Duffy and J. W. Thatcher, Jr. Bell System Technical Journal, Volume 50, pgs. 1311-1347, April 1971; and Data Communications, Networks and Systems by T. Bartec, Macmillan Company, 1985.

In a data transmission system, an uncorrectable, defective bit packet received by the receiver requires that a replacement bit packet be sent by the transmitter. In most high speed systems, the transmitter sends a continuous sequence of packets. The receipt of a bad packet, and subsequent notification thereof by the receiver, causes the transmission to be aborted, with the transmitter having to resend the bad packet and all succeeding packets. This type of operation also significantly degrades system throughput.

The present invention is specifically directed to a high speed, error-free method of data transmission in a very noisy environment, such as a cellular telephone link, but is also beneficial in land-based wire line or other transmission systems. The preferred embodiment of the invention is used with a modem that meets CCITT (Consultant Committee on International Telephone and Telegraphy) Specification V.32. The V.32 specification is currently directed to data transmission rates of 9600/4800 Baud. The inventive method is embodied in a protocol that incorporates a number of novel features including adaptive data compression, selective FEC, interleaving to expand FEC effectiveness, error protection and a data carousel for permitting retransmission of defective digital information packets by interspersing them into the normal sequence of packet transmissions. Each of the aspects of the invention is useful apart from its combination in the preferred embodiment of the invention. The preferred method also uses variable packet sizes, where the size of the bit packets is based, in part, on the rate of data input to increase data transmission. An added benefit of the inventive method is that the transmitted digital information is secure because the processing also encrypts the data.

OBJECTS OF THE INVENTION

A principal object of the invention is to provide a method of operating a novel, high speed data transfer system.

Another object of the invention is to provide a data transmission system method having improved accuracy.

A further object of the invention is to provide a high speed, error-free data transmission system method having improved throughput.

A still further object of the invention is to provide a high speed method of error-free transmission and reception of data over a noisy link.

Still another object of the invention is to provide a novel modem arrangement for high speed data transfer over a noisy link.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
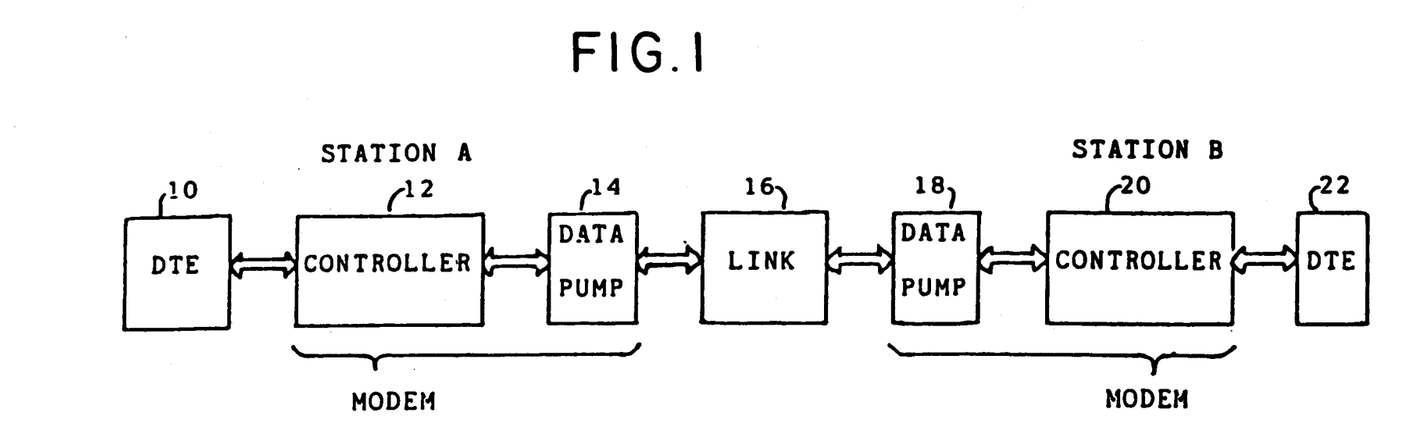
FIG. 1 is a block diagram of a transmitting and receiving system with an interconnecting link, with which the method of the invention is useful.

Referring to FIG. 1, Station A includes a data entry terminal 10 that is bidirectionally coupled to a microprocessor based controller 12 which is bidirectionally coupled to a data pump 14 that feeds a transmission link 16. These elements constitute the transmitter at Station A with controller 12 and data pump 14 comprising a modem for accepting input information, preparing it for transmission and for transmitting it over transmission link 16. At the receiver at Station B, a data pump 18 is intercoupled with transmission link 16 and supplies information to a microprocessor based controller 20 that is, in turn, coupled to a data entry terminal 22. Data pump 18 and controller 20 likewise may constitute a receiving modem. As is well known, the provision of the bidirectional paths indicates that the system operates in either direction with the transmitter operating as a transmitter for data flow in one direction and as a receiver for data flow in the opposite direction—simultaneously. Such transmitter-receivers are full duplex and are also commonly referred to as transceivers.

The data entry terminal at either Station A or Station B may comprise a keyboard, a telephone, a computer or a data file transfer system. The data pumps 14 and 18 are in all respects conventional and include analog-to-digital and digital-to-analog converters and the appropriate mechanisms for transmitting/ receiving data via the transmission link 16. Thus the data pumps may include RF modulation equipment for sending the data out as modulations of an RF carrier, or telephone access equipment for telephone line communications. In the preferred embodiment of the invention, using a modem meeting standard V.32, the data pumps will also include echo cancellation apparatus.

It will be noted that the various aspects and functions of the present invention are confined to and carried out by the controller of FIG. 1. The data pump and the controller may be combined in a modem or may be physically separate units that are connectable via conventional RS232 serial ports or by any other conventional interconnection method. This modularity makes the invention useful with any modem, but should not be considered a limitation.

Figure 2:
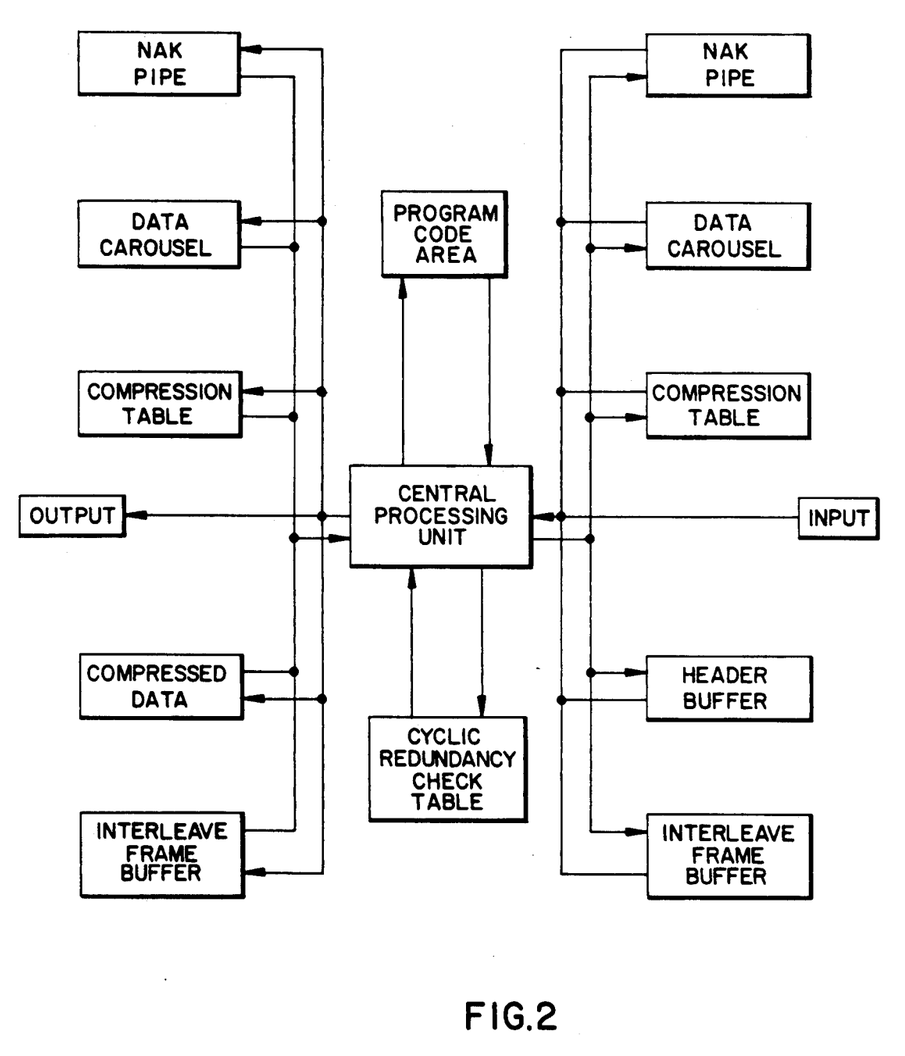
FIG. 2 is a block diagram of the microprocessor-based controller constructed in accordance with the invention.

With reference to FIG. 2, it will be seen that the various aspects of the invention are implemented in an integrated combination of electronic circuitry and software. That is the preferred implementation, but the invention is not to be considered limited thereto. It will also be noted that the FIG. 2 showing illustrates only one-half of a full duplex system. Operation in the reverse manner, simultaneously, should be understood with transmitter and receiver functions (and input and outputs) being interchanged. It may be advantageous to consider FIGS. 5A-5C and 6A-6D, which are respective commented flow charts for the transmitter and receiver, in conjunction with the further description of FIG. 2.

An asynchronous data stream comprising digital bits of information (at a variable data rate) is applied to the transmitter input of FIG. 2. The data conventionally includes start bits and stop bits defining data words in either a continuous or a broken stream. Synchronous serial or parallel data may also be applied to the transmitter. The data words are 8 bits long and the stop and start bits are removed as the sequential data stream is loaded into memory buffers. The number of characters (8 bit data words) received during a predetermined time interval is monitored and if the data rate indicates manual input of data, such as that from a keyboard terminal, no data compression is performed. This is because data compression groups of 1000 bits or more are stored prior to performing compression and if the input data rate is slow, system throughput will be seriously degraded by waiting to accumulate data bits. An incoming character buffer is used, and when no characters are available, a bit packet is arbitrarily formed by adding bits to completely fill the compression buffer.

The information, either compressed or uncompressed, is subjected to forward error correction and interleaving, which enhances the benefit of FEC. FEC and interleave processing may also be turned off to increase throughput in the event that a "clean," as opposed to a noisy, transmission link is being used. This could be a pair of leased telephone lines or simply a temporary clean condition in an otherwise noisy link.

The criteria for determining when FEC is turned off is in part based upon the data rate and empirical evidence. In the preferred embodiment of the invention, FEC is turned off when six consecutive error-free digital information packets are received. (A digital information packet may be either 72 and 432 bytes in length.)

The FEC packets are formulated into information packet form for transmission with a header structure containing a packet identification number, packet size and data file size information. A CRC code is added for early verification of the integrity of the header structure, the FEC encoded data is added, another CRC code is appended and the completed digital information packet is transferred to a transmission packet carousel for transmission to the data pump. Since the system is a full duplex, i.e., completely bidirectional, it is capable of simultaneously transmitting and receiving at Station A, with the opposite operations being carried out for data at Station B. Controllers may be both transmitting and receiving at the same time. Incoming data from Station A is loaded into the receiver data carousel at Station B, when determined to be error-free, and subsequently "decompressed" and provided to the data entry terminal at Station B.

As mentioned, the data compression technique utilized is LZW adapted for the use of 10 and 12 bit table entries. These size entries are even numbered, which simplifies high-speed processing and enables implementation of the compressed data with the size of the interleave frame employed. The Golay FEC, as implemented in the preferred embodiment of the invention, doubles the size of the digital data by generating a mating check word for each code word. The FEC allows detection of 4 bit errors and the correction of 3 bit errors per code word and mating check word combination.

Figure 3A:
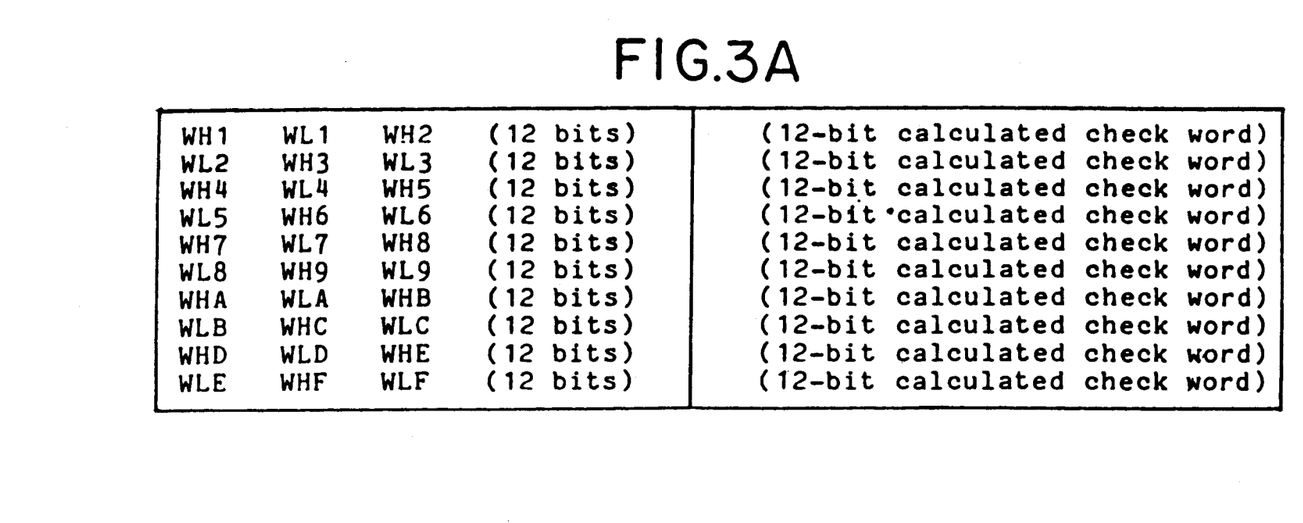
FIG. 3 is a table illustrating the arrangement of code words and mating check words in a bit matrix memory of the invention.
Figure 4:
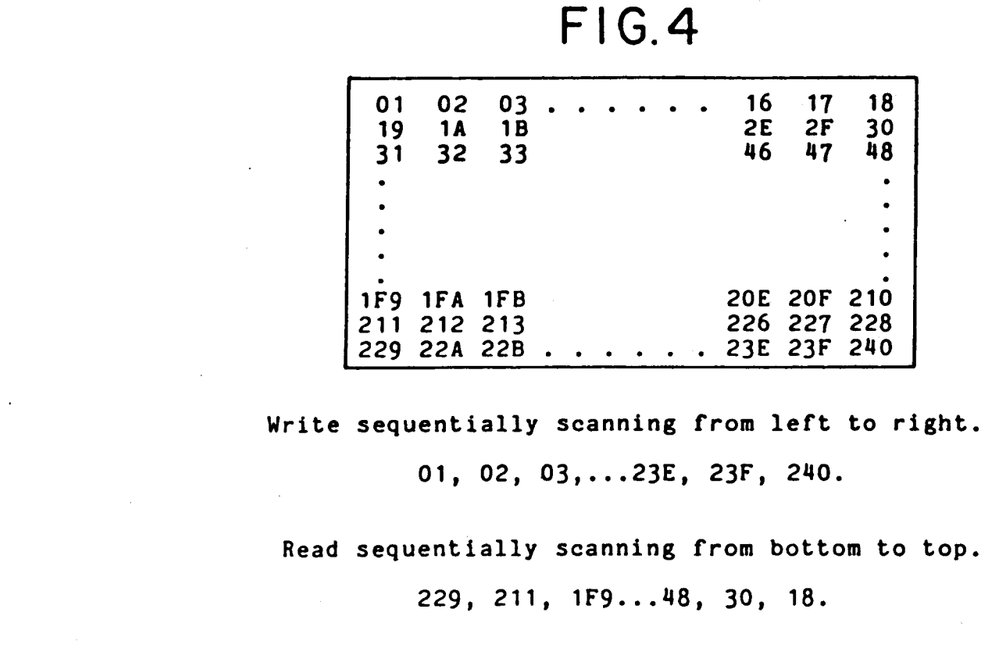
FIG. 4 pictorially illustrates the arrangement of an interleave frame bit matrix and the patterns of scanning.
Figure 5A:
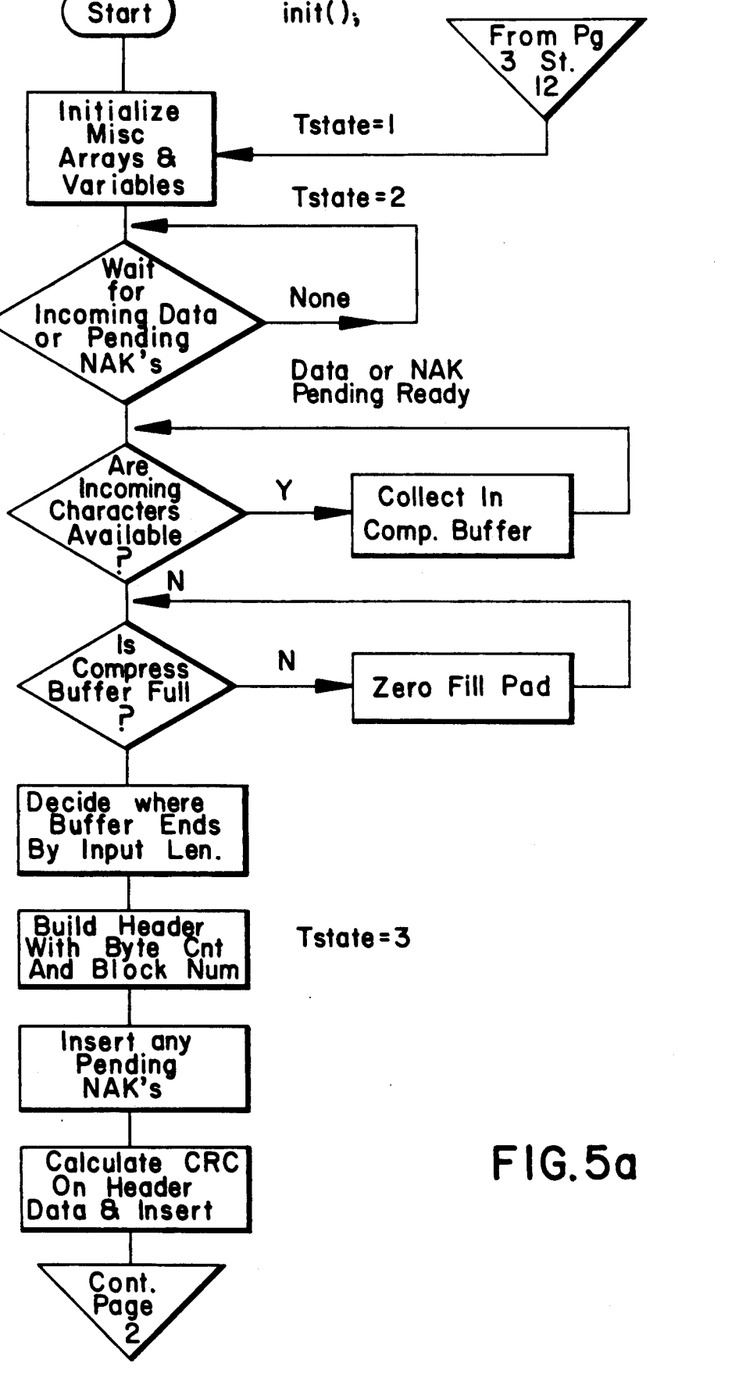
FIGS. 5A-5C are a commented flow chart for a transmitter constructed in accordance with the invention.
Figure 5B:
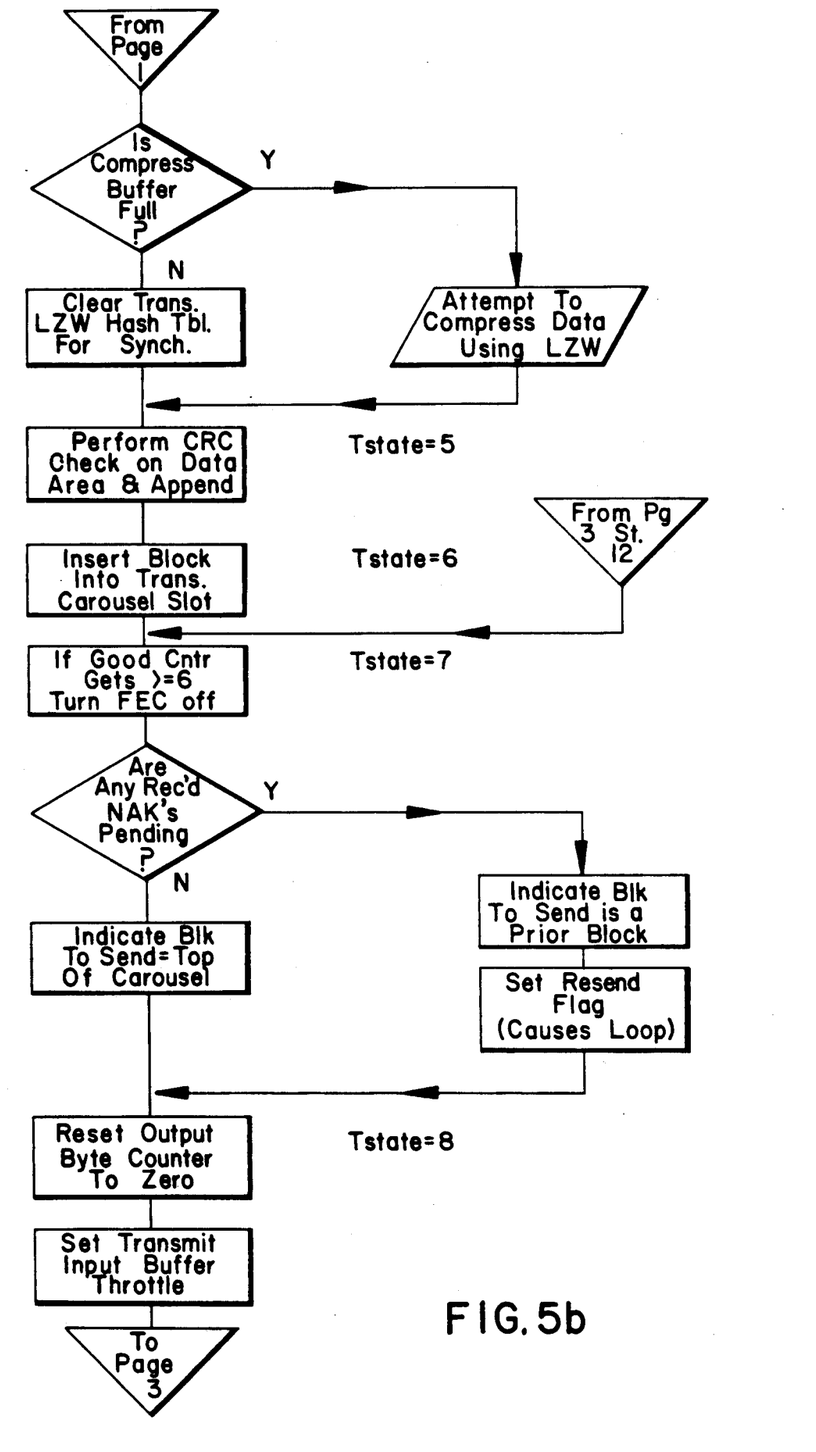
Figure 5C:
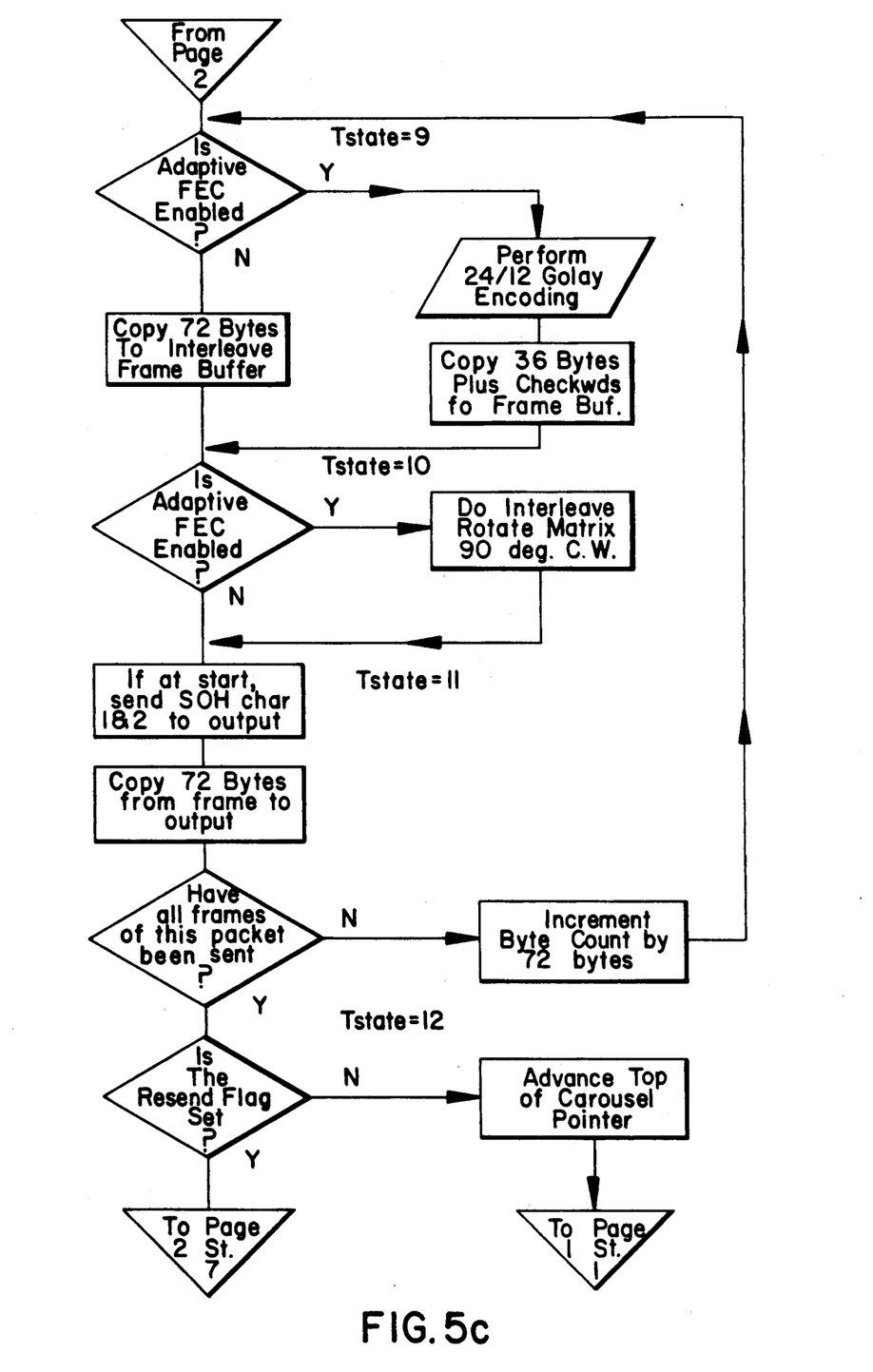
Figure 6A:
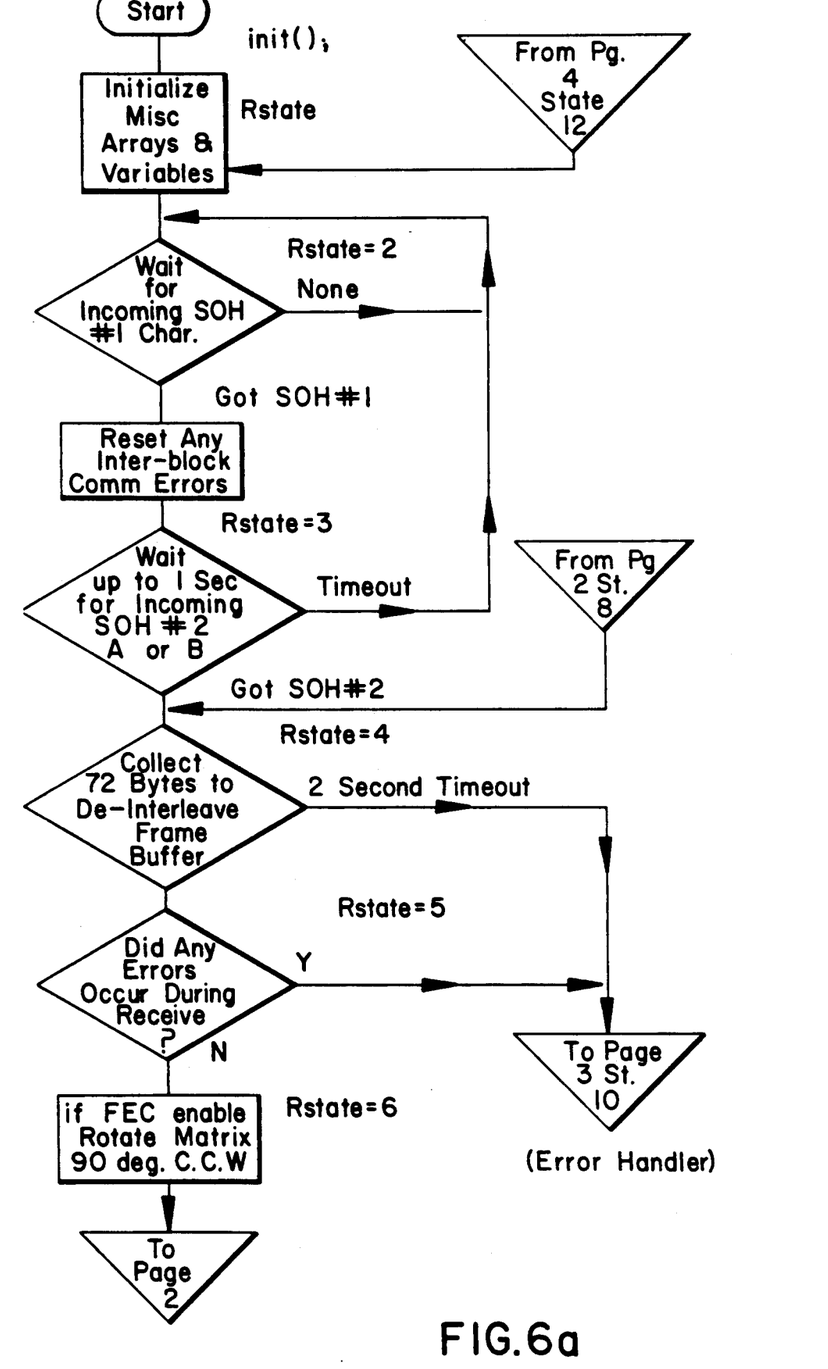
FIGS. 6A-6D are a commented flow chart for a receiver constructed in accordance with the invention.
Figure 6B:
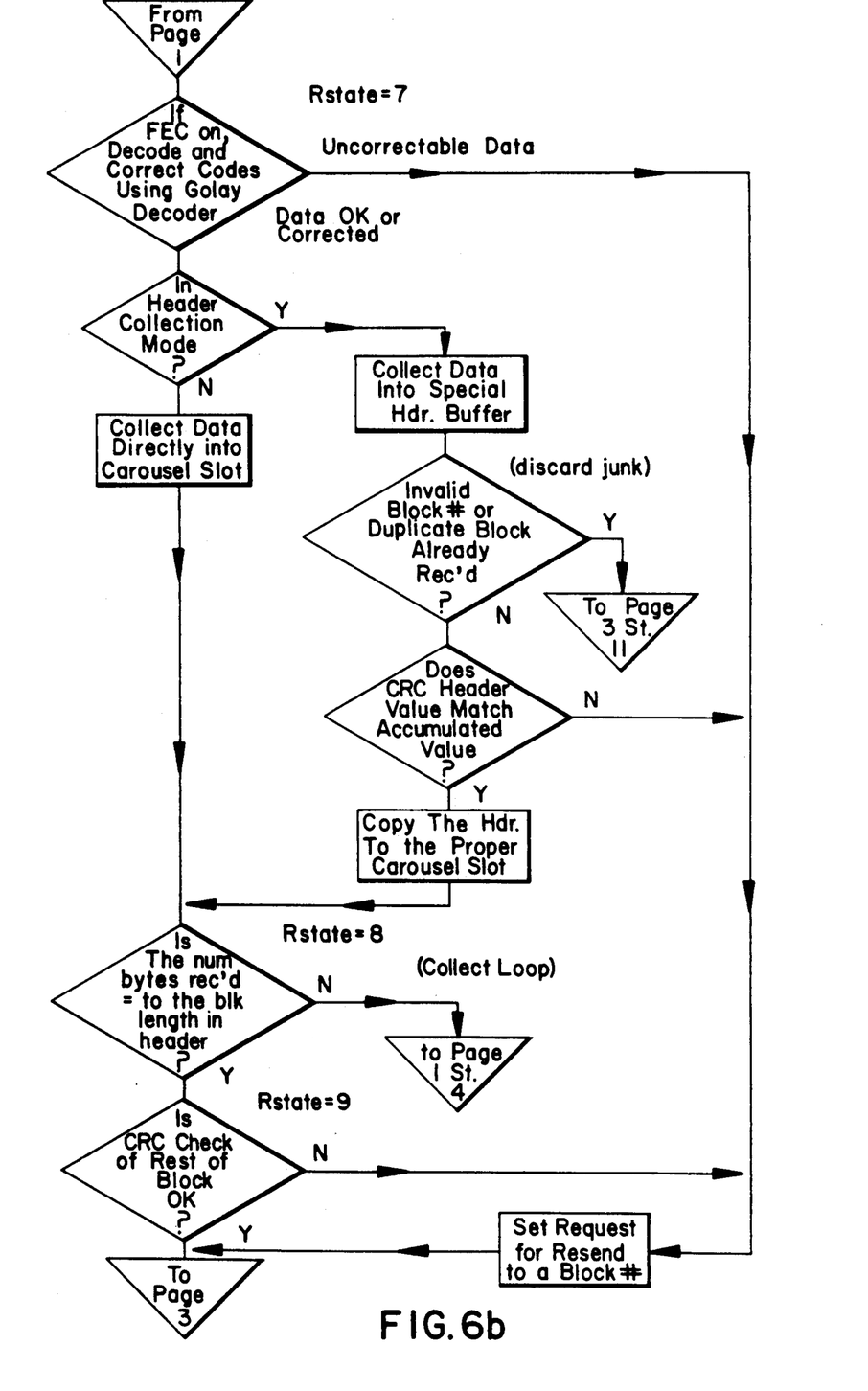
Figure 6C:
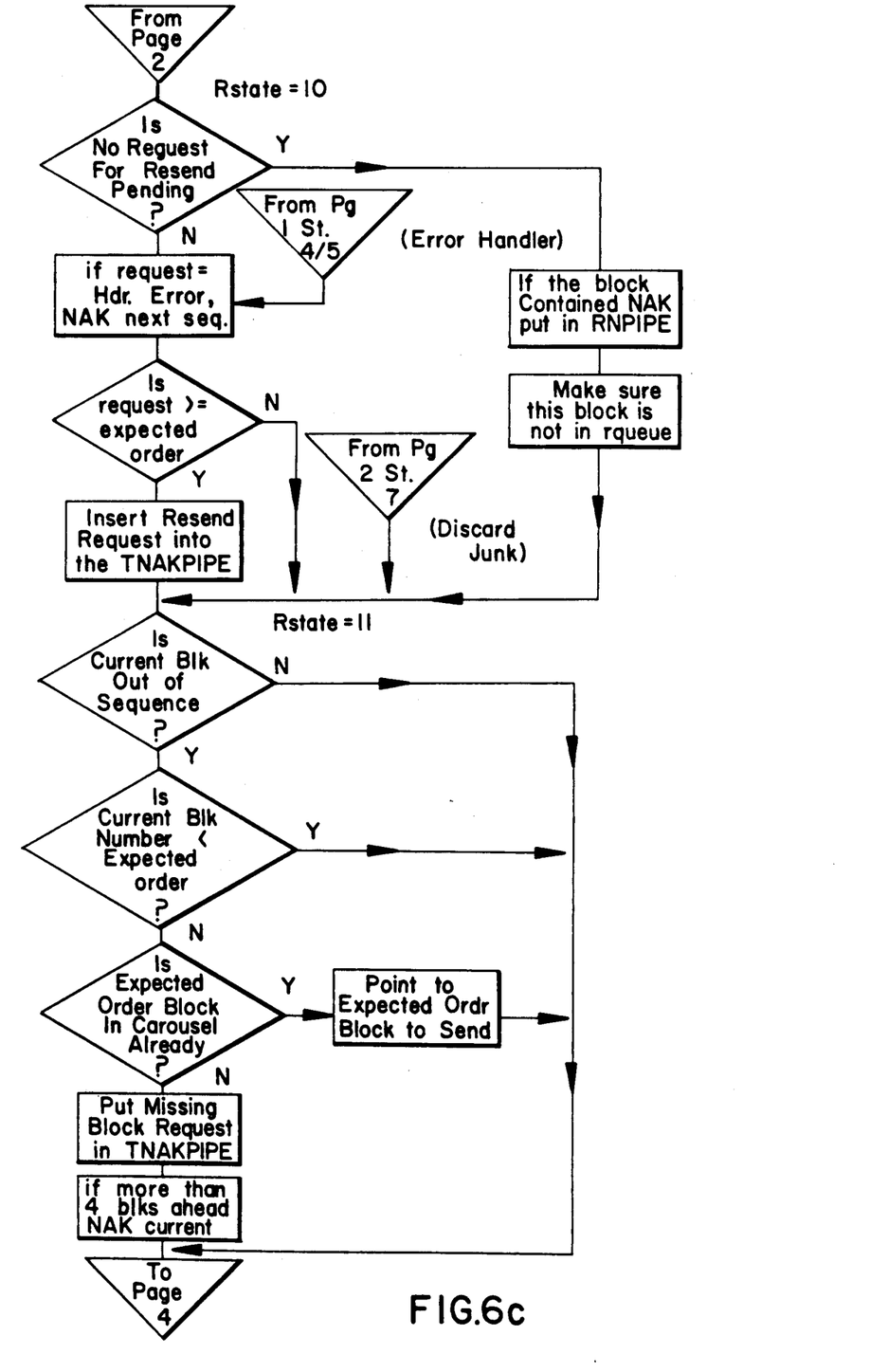
Figure 6D:
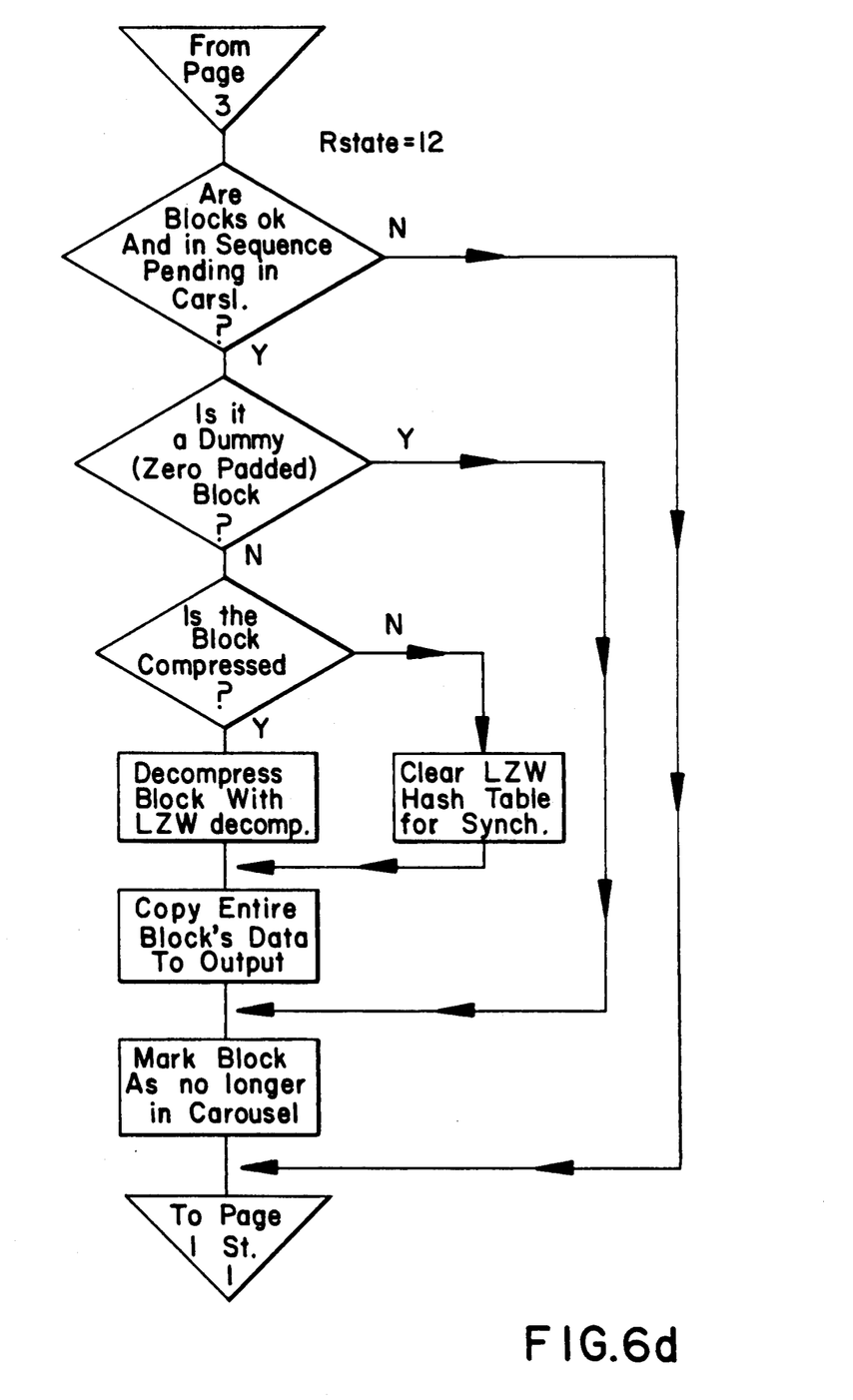

The invention uses an interleave frame or bit matrix memory to greatly expand the effectiveness of the FEC. Interleaving is writing information sequentially into a bit memory in one pattern and reading bits out sequentially in another pattern for transmission. While in the preferred implementation, a bit matrix memory is used with horizontal and vertical scanning for writing and reading, it should be apparent that there are other, albeit less effective ways, to interleave without a bit matrix memory. For example, address stepping with a serial memory with address points at the terminations of code word—check word combinations may be used at the cost of extra instructions per combination. Reference to FIGS. 3 and 4 discloses the preferred arrangement of code words and mating check words in the "interleave frame" (FIG. 3) and the bit positions in the matrix (FIG. 4) using hexadecimal notation.

Each interleave frame consists of a 24 bit×24 bit memory. A plurality of interleave frames are connected in series to make up a block of 432 bytes. Here again, it will be appreciated by those skilled in the art that the actual array size of an interleave frame and the number of frames in a block are selected to optimize the throughput of the particular data transmission system. In this connection, the effectiveness of interleaving is optimized by formulating 12 bit code words (representing one and one-half words of data) and mating 12 bit check words (representing the FEC word) and writing them horizontally (in a scanning pattern) in the 24 bit×24 bit matrix. When the bits are read out of the bit matrix memory in a vertical direction, separation of the individual bits of the code words and check words, by an amount that is related to the size of the interleave frame, results. In a 24 bit×24 bit arrangement, the ability to correct 3 bits in a particular code word—check word combination is thus expanded to 3 times 24. Consequently, the duration of a noise impulse that may be tolerated without requiring a resend of an information packet is multiplied twenty-four fold.

In FIG. 3, WH1 are the most significant form bits (MSB) of the first data word, WL1 the least significant form bits (LSB) of data word 1, WH2 the MSB of data word 2, WL2 the LSB of data word 2, etc. It will be seen that, in vertically (upwardly) reading out the bit matrix, the bits in any code word—check word combination are separated during transmission to significantly increase the FEC effectiveness. An added benefit of FEC coding and interleaving is in system security because information is unintelligible to an unauthorized receiver. In cellular communications in particular, this is an important characteristic. In practice a matrix rotation of 90 degrees clockwise is used to simplify operation with the interleave frame. Hence the reading in an upwardly vertical direction.

Figure 7:
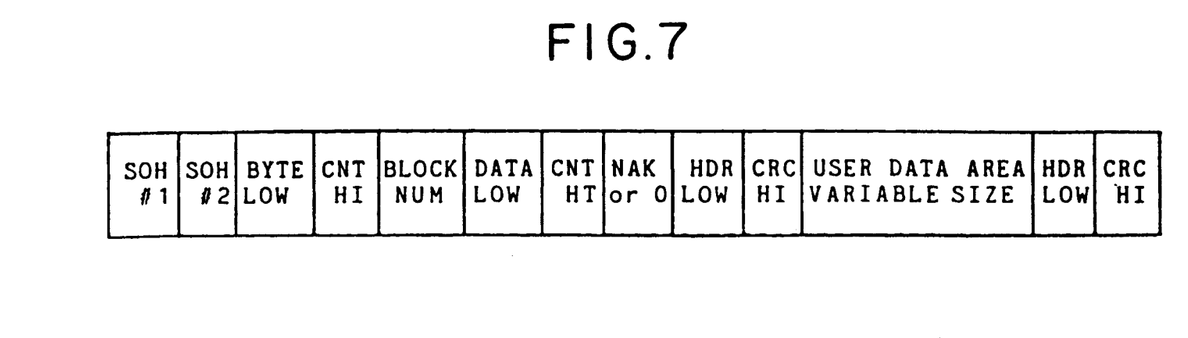
FIG. 7 illustrates the header and packet structure.

In FIG. 7, the makeup of the digital information packet structure used in the preferred embodiment is shown. The maximum total packet size is 432 bytes, although, as mentioned above, this number is not to be considered limiting. The first two bytes are labelled SOH (start of header) with the first byte being hexadecimal AA and the second byte being either hexadecimal 55 or 5A. These two bytes are selected to be unique from any other characters that may ever be encountered and are not counted in the total block byte count. The 55 hexadecimal denotes no FEC and 5A denotes FEC. The next two bytes of the header are the total byte count in the digital information packet structure or block. This is a two-byte number with the byte of lowest significance occupying the first byte position in the header and that of greater significance occupying the second byte position in the header. The next byte identifies the block number, which in the preferred embodiment is 1 to 255. (0 is an invalid block number.) The next two bytes are the data count, that is the number of actual bytes in the data portion of the block. The next block is a NAK (numbered no acknowledgment) and constitutes a resend request to the other station to resend a particular numbered, previously transmitted digital information packet. Since each of Station A and B can transmit, they have their own transmission packet numbers. The 0 indicates "no NAK" or no request for a packet resend. The next two bytes consist of a header CRC code. The provision of a header CRC contributes to system throughput because an error received in the header saves the need for time consuming processing by immediately requesting a resend (via a NAK). The next group of bytes is variable (within the limits set for information packet or block size) and comprises the user data. The last two bytes are the packet CRC code for determining whether the packet has been received error-free.

The packets are loaded onto a transmission packet "carousel" which consists of a cyclical array of segmented memory with 16 sectors of 432 bytes each. It may be helpful to think of it as children's pony carousel with 16 ponies representing packet carriers. Packets are loaded onto the carousel and are identified by their packet numbers. When the carousel is full, the oldest packet is overwritten by the new packet being loaded on the carousel. Transmission is sequential and continuous. The transmitter is never allowed to overwrite a packet on the carousel that has not been acknowledged as being received error-free In the receiver, the packets are CRC code checked and forward error corrected before they are loaded onto a receiving carousel, which also has 16 sectors of 432 bytes each. First the header CRC is checked, then the packet CRC, and FEC decoding, if used, is performed. A defective packet is not loaded on the carousel but the sector corresponding thereto is left empty. The receiver will immediately NAK (request a resend of) that packet by inserting its packet number in the next digital information packet sent to the transmitter. (If no data is available for transmission the NAK will be sent in a padded packet) All subsequently transmitted packets are received, error checked and corrected and, if found to be error-free, loaded onto the successive sectors of the carousel following the empty sector. An error-free packet replacement for a defective packet is loaded into the empty slot corresponding to it on the carousel and only then are the higher numbered packets removed for further processing. Since the data has a specific time relationship, it is essential that packets not be removed from the carousel out of order to maintain the packet sequence. Should a subsequent NAK not result in an error-free replacement packet being received, the receiver will NAK incoming good packets to preclude the transmitter from losing data by overrunning the carousel. As in most transmitter systems, the incoming data is throttled or held up when the transmitter is in danger of falling behind. Thus, the receiver controls the transmitter, which controls the incoming data stream. In the preferred embodiment the input data rate is preferably twice the rate of the transmission link, which allows for benefits realized from data compression.

While a specific implementation of the invention has been described, it is recognized that modifications thereof will readily occur to those skilled in the art without departing from its true spirit. The invention is to be limited only as defined in the claims.

What is claimed is:

1. A method of transmitting data from a transmitter to a receiver with improved throughput comprising the steps of:
    formulating data into identifiable packets;
    sequentially transmitting said packets to a receiver;
    checking for errors in received packets;
    loading error-free packets in sequence onto a packet carousel having a fixed number of packet positions;
    removing error-free packets in sequence from said carousel;
    signaling the identity of a defective packet to said transmitter in a header identifying the number of the packet, the number of total bytes and the number of data bytes in the packet, and error detection information;
    maintaining an empty position on said packet carousel for a packet found to be defective;
    retaining error-free data packets in positions subsequent to said empty position on said carousel; and
    retransmitting said identified packet by interspersing it in the normal sequence of transmitted packets.

2. The method of claim 1 including a transmitter packet carousel, further comprising the steps of:
    sequentially loading numbered packets onto said transmitter packet carousel;
    removing packets from said transmitter packet carousel; and
    overwriting the oldest packet with a new packet when said transmitter packet carousel becomes full.

3. The method of claim 2 wherein the receiver signals the identity of a defective packet by communicating the number of the defective packet to the transmitter.

4. A method of operating a modem in a noisy medium comprising the steps of:
    compressing data to reduce the need to transmit repetitive bit groupings;
    forming forward error corrected bit packets of code words and check words from said compressed data;
    interleaving said bit packets to separate adjacent bits of said code words and said words;
    formulating digital information packets from said interleaved bit packets;
    providing headers for said digital information packets that identify each packet;
    transmitting said digital information packets sequentially to a receiver; and
    retransmitting a packet found defective, upon receipt of a request therefor from said receiver, by breaking into the normal sequence of transmitted packets.

5. The method of claim 4, further comprising the steps of loading said packets onto a transmitter carousel.
    sequentially removing said packets for transmission; and
    overwriting the oldest packet on the carousel with a new packet when the carousel is full.

6. The method of claim 5, further comprising the steps of:
    loading received error-free packets onto a receiver carousel;
    removing error-free packets from the receiver carousel in sequence;
    holding open positions on the receiver carousel for defective packets; and
    holding packets, in positions subsequent to an open position, on the receiver carousel.

7. A method of operating a high speed modem over a noisy link to increase throughput of data from a transmitter to a receiver comprising the steps of:
    selectively compressing data to reduce the need to transmit repetitive bit groupings;
    formulating forward error corrected bit packets of code words and check words from said selectively compressed data;
    interleaving said bit packets to separate adjacent bits of said code words and said check words;
    formulating digital information packets from said interleaved bit packets with a header including packet identification;
    error protecting said digital information packets;
    loading said digital information packets onto a transmitter packet carousel;
    transmitting said digital information packets from said carousel in sequence;
    terminating forward error correction during noise-free digital information periods on the link; and
    retransmitting a defective digital information packet by interspersing it into the sequence of packets loaded onto the carousel.

8. The method of claim 7 wherein said interleaved bit packets are formed by writing the bits of said code words and said check words into a bit memory matrix in a first pattern and reading said bits from said bit memory matrix in a second pattern.

9. The method of claim 8 wherein there are a plurality of bit memory matrices, with each said digital information packet comprising a series of said memory matrices and wherein said code words comprise bits from more than one data word.

10. The method of claim 9 wherein said forward error correction utilizes Golay encoding and wherein compression is based upon Lempel-Zev-Welch techniques adapted for 10 and 12 bit strings.

11. The method of claim 10 wherein said digital information packets are of variable length and wherein each header includes information as to the length of its associated digital information packet.

12. A microprocessor based data transfer system comprising:
   a source of data;
   means for compressing data from said source;
   means for forward error correcting said compressed data;
   interleave means for separating adjacent bits in said forward error corrected data;
   means for arranging said interleaved data in packets;
   means for error protecting said packets;
   packet carousel means;
   means for numbering said error protected packets;
   means for loading said error protective packets onto said packet carousel means;
   means for sequentially transmitting said error protected interleaved data packets to a receiver; and
   means for retransmitting a defective numbered packet by interspersing it in the sequence of transmission of error protected packets responsive to a defective packet signal from said receiver.

13. The system of claim 12 further including means for monitoring the rate of said data from said source and means for selectively disabling said compression means based upon said rate.

14. The system of claim 13 further including means for selectively disabling said forward error correction based upon receipt of said defective packet signals.

15. A high speed microprocessor based data transfer system comprising:
   means for supplying serial data to a transmitter;
   means for selectively compressing said serial data depending upon the rate of said serial data;
   means for forming said data into a plurality of code word and mating check word combinations for forward error correcting said data;
   means for interleaving said forward error corrected data to separate adjacent bits in said code word and check word combinations;
   means for formulating error protected packets of said interleaved data;
   means for formulating said error protective packets;
   means for lacing said error protective packets onto a transmitter packet carousel;
   means for sequentially transmitting said error protected packets from said transmitter packet carousel to a receiver;
   means for receiving and decoding defective packet signals from said receiver;
   means for detecting defective packets at said receiver;
   means for indicating the numbers of defective packets in said packet signals sent to said transmitter;
   means for loading error free detected packets onto a receiver packet carousel; and
   means at said transmitter for transmitting a replacement for a defective packet by interspersing it in the normal sequence of transmitted packets.

16. The system of claim 15 wherein said packet carousels each comprise a fixed number of sectors and wherein said receiver skips a sector corresponding to a received defective packet and holds subsequentially received error free packets on said receiver packet carousel until an error free replacement for said defective packet is received and loaded in said skipped sector.

17. The system of claim 16, wherein said transmitter includes means for terminating said forward error correcting as a function of the receipt of said packet signals from said receiver.

* * * * *

UNITED STATES PATENT AND TRADEMARK OFFICE
CERTIFICATE OF CORRECTION

PATENT NO. : 5,010,553

DATED : April 23, 1991

INVENTOR(S) : Clifford D. Scheller, Aaron A. Collins and Joseph M. Hansen

It is certified that error appears in the above-identified patent and that said Letters Patent is hereby corrected as shown below:

Column 1, line 54, delete ")" after --"compression table"--;

Column 10, line 17, delete "formulating", insert --numbering--;

line 18, delete "lacing", insert --loading--.

Signed and Sealed this

Fifteenth Day of September, 1992

*Attest:*

DOUGLAS B. COMER

*Attesting Officer*      *Acting Commissioner of Patents and Trademarks*